US011518499B2

(12) United States Patent
Ramakrishnan et al.

(10) Patent No.: US 11,518,499 B2
(45) Date of Patent: Dec. 6, 2022

(54) NACELLE FOR AN AIRCRAFT AFT FAN

(71) Applicant: General Electric Company, Schenectady, NY (US)

(72) Inventors: Kishore Ramakrishnan, Rexford, NY (US); Trevor Howard Wood, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 88 days.

(21) Appl. No.: 16/987,934

(22) Filed: Aug. 7, 2020

(65) Prior Publication Data

US 2021/0107631 A1    Apr. 15, 2021

Related U.S. Application Data

(60) Division of application No. 15/411,228, filed on Jan. 20, 2017, now abandoned, which is a
(Continued)

(51) Int. Cl.
| | |
|---|---|
| *B64D 29/04* | (2006.01) |
| *B64C 21/06* | (2006.01) |
| *B64D 27/20* | (2006.01) |
| *B64D 33/02* | (2006.01) |
| *B64C 7/02* | (2006.01) |

(Continued)

(52) U.S. Cl.
CPC .............. *B64C 21/06* (2013.01); *B64C 7/02* (2013.01); *B64D 27/20* (2013.01); *B64D 27/24* (2013.01); *B64D 29/04* (2013.01); *B64D 33/02* (2013.01); *B64C 2230/04* (2013.01); *B64C 2230/06* (2013.01); *B64C 2230/20* (2013.01); *B64D 27/14* (2013.01); *B64D 2033/0226* (2013.01); *Y02T 50/10* (2013.01)

(58) Field of Classification Search
CPC .......... B64D 29/04; B64C 39/14; B64C 27/20
See application file for complete search history.

(56) References Cited

U.S. PATENT DOCUMENTS

| | | |
|---|---|---|
| 3,879,941 A | 4/1975 | Sargisson |
| 4,156,344 A | 5/1979 | Cuthbertson et al. |
| | (Continued) | |

FOREIGN PATENT DOCUMENTS

| | | |
|---|---|---|
| CN | 104691741 A | 6/2015 |
| EP | 2204567 A2 | 7/2010 |
| | (Continued) | |

OTHER PUBLICATIONS

European Search Report & Opinion Corresponding to EP18151056.1 dated Mar. 19, 2018.

(Continued)

*Primary Examiner* — Philip J Bonzell
(74) *Attorney, Agent, or Firm* — Dority & Manning, P.A.

(57) ABSTRACT

An aircraft defines a longitudinal direction and includes a fuselage extending between a forward end and an aft end along the longitudinal direction of the aircraft. An aft engine is mounted to the aft end of the fuselage. The aft engine further includes a nacelle including a forward section. An airflow duct extends at least partially through the nacelle of the aft engine and defines an outlet on the forward section of the nacelle for providing an airflow to the forward section of the nacelle.

18 Claims, 8 Drawing Sheets

Related U.S. Application Data continuation-in-part of application No. 15/281,990, filed on Sep. 30, 2016, now Pat. No. 10,501,196.

(51) Int. Cl.
  *B64D 27/24* (2006.01)
  *B64D 27/14* (2006.01)

(56) References Cited

U.S. PATENT DOCUMENTS

| | | | |
|---|---|---|---|
| 5,058,617 A | 10/1991 | Stockman et al. | |
| 5,447,283 A | 9/1995 | Tindell | |
| 5,934,611 A * | 8/1999 | Tindell | B64C 21/025 244/130 |
| 6,360,989 B1 | 3/2002 | Maguire | |
| 6,634,595 B2 * | 10/2003 | Koncsek | F02C 7/042 137/15.1 |
| 7,637,455 B2 | 12/2009 | Silkey et al. | |
| 7,685,805 B2 | 3/2010 | Alecu | |
| 7,730,714 B2 | 6/2010 | Wood et al. | |
| 7,766,280 B2 | 8/2010 | Cloft et al. | |
| 8,205,430 B2 | 6/2012 | Jain | |
| 8,282,037 B2 | 10/2012 | Jain | |
| 8,402,739 B2 | 3/2013 | Jain et al. | |
| 8,408,491 B2 | 4/2013 | Jain et al. | |
| 8,459,597 B2 | 6/2013 | Cloft et al. | |
| 8,596,573 B2 | 12/2013 | Jain | |
| 8,684,302 B2 | 4/2014 | Chanez et al. | |
| 8,702,042 B2 | 4/2014 | Gerber et al. | |
| 8,753,072 B2 | 6/2014 | Vauchel et al. | |
| 9,004,399 B2 | 4/2015 | Jain | |
| 9,403,600 B2 | 8/2016 | Leland et al. | |
| 9,719,424 B2 | 8/2017 | Teia Dos Santos Mendes Gomes | |
| 10,000,293 B2 | 6/2018 | Hamel et al. | |
| 10,024,236 B2 | 7/2018 | Romano et al. | |
| 10,131,443 B2 * | 11/2018 | Namgoong | F02C 7/045 |
| 10,316,753 B2 | 6/2019 | Packard et al. | |
| 10,676,205 B2 | 6/2020 | Niergarth et al. | |
| 10,823,056 B2 | 11/2020 | Suciu et al. | |
| 10,926,874 B2 | 2/2021 | Giannini et al. | |
| 2008/0173766 A1 | 7/2008 | Manley | |
| 2008/0308684 A1 | 12/2008 | Chaudhry | |
| 2008/0310956 A1 | 12/2008 | Jain | |
| 2009/0121083 A1 * | 5/2009 | Jain | B64D 29/00 137/142 |
| 2009/0140104 A1 * | 6/2009 | Surply | B64D 33/02 244/53 B |
| 2010/0162680 A1 | 7/2010 | Khalid | |
| 2016/0122005 A1 | 5/2016 | Florea et al. | |
| 2016/0332741 A1 * | 11/2016 | Moxon | B64C 21/00 |
| 2018/0016000 A1 * | 1/2018 | Pastouchenko | B64D 29/04 |
| 2018/0093776 A1 | 4/2018 | Ramakrishnan et al. | |

FOREIGN PATENT DOCUMENTS

| | | |
|---|---|---|
| EP | 2434095 A2 | 3/2012 |
| EP | 2607657 A2 | 6/2013 |
| EP | 3112269 A1 | 1/2017 |
| WO | WO2013/141930 A1 | 9/2013 |
| WO | WO2015/130384 A2 | 9/2015 |

OTHER PUBLICATIONS

Chen et al., "Nacelle: Air Intake Aerodynamic Design and Inlet Compatibility", Compressors, pp. 8, Dec. 15-17, 2014.
Tomita et al., "Nacelle Design for Mixed Turbofan Engines", Aircraft Engine, vol. 2, pp. 10, p. 201-210, May 8-11, 2006.

\* cited by examiner

NACELLE FOR AN AIRCRAFT AFT FAN

CROSS-REFERENCE TO RELATED APPLICATIONS

This application claims priority to U.S. Non-Provisional application Ser. No. 15/411,228, entitled "NACELLE FOR AN AIRCRAFT AFT FAN," filed on Jan. 20, 2017, which claims priority to U.S. Pat. No. 10,501,196, entitled "NACELLE FOR AN AIRCRAFT AFT FAN," filed on Sep. 30, 2016. The entire contents of the above-referenced applications are hereby incorporated by reference in its entirety for all purposes.

FIELD

The present subject matter relates generally to an aft engine for an aircraft propulsion system, and more particularly to a nacelle for the aft engine.

BACKGROUND

A conventional commercial aircraft generally includes a fuselage, a pair of wings, and a propulsion system that provides thrust. The propulsion system typically includes at least two aircraft engines, such as turbofan jet engines. Each turbofan jet engine is mounted to a respective one of the wings of the aircraft, such as in a suspended position beneath the wing, separated from the wing and fuselage. Such a configuration allows for the turbofan jet engines to interact with separate, freestream airflows that are not impacted by the wings and/or fuselage. This configuration can reduce an amount of turbulence within the air entering an inlet of each respective turbofan jet engine, which has a positive effect on a net propulsive thrust of the aircraft.

However, a drag on the aircraft including the turbofan jet engines, also has an effect on the net propulsive thrust of the aircraft. A total amount of drag on the aircraft, including skin friction and form drag, is generally proportional to a difference between a freestream velocity of air approaching the aircraft and an average velocity of a wake downstream from the aircraft that is produced due to the drag on the aircraft.

Certain solutions to reducing an overall drag of an aircraft include positioning a fan at an aft end of the fuselage of the aircraft to re-energize a boundary layer airflow over the aft end of the fuselage. Accordingly, an aft fan configured to maximize an amount of relatively low momentum boundary layer air ingested would be useful.

BRIEF DESCRIPTION

Aspects and advantages of the invention will be set forth in part in the following description, or may be obvious from the description, or may be learned through practice of the invention.

In some embodiments of the present disclosure, an aircraft defines a longitudinal direction and includes a fuselage extending between a forward end and an aft end along the longitudinal direction of the aircraft. An aft engine is mounted to the aft end of the fuselage. The aft engine further having a nacelle including a forward section. An airflow duct extends at least partially through the nacelle of the aft engine and defines an outlet on the forward section of the nacelle for providing an airflow to the forward section of the nacelle.

In some embodiments of the present disclosure, a propulsion system for an aircraft is disclosed. The aircraft includes a fuselage defining an aft end. The propulsion system includes an aft engine configured to be mounted to the aft end of the fuselage. The aft engine further has a nacelle including a forward section. An airflow duct extends at least partially through the nacelle of the aft engine and includes first and second outlets on the forward section of the nacelle for providing an airflow to the forward section of the nacelle.

In some embodiments of the present disclosure, an aircraft defines a longitudinal direction and includes a fuselage extending between a forward end and an aft end along the longitudinal direction of the aircraft. An aft engine is mounted to the aft end of the fuselage. The aft engine further has a nacelle including a forward section. An airflow duct extends at least partially through the nacelle of the aft engine and includes an outlet on the forward section of the nacelle and radially below a fan shaft for providing an airflow to the forward section of the nacelle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component from another and are not intended to signify location or importance of the individual components. The terms "forward" and "aft" refer to the relative positions of a component based on an actual or anticipated direction of travel. For example, "forward" may refer to a front of an aircraft based on an anticipated direction of travel of the aircraft, and "aft" may refer to a back of the aircraft based on an anticipated direction of travel of the aircraft. Additionally, the terms "upstream" and "downstream" refer to the relative direction with respect to fluid flow in a fluid pathway. For example, "upstream" refers to the direction from which the fluid flows, and "downstream" refers to the direction to which the fluid flows.

Generally, the present disclosure is directed to a propulsion system and an aircraft including the same. The propulsion system generally includes an aft engine mounted to an aft end of a fuselage of the aircraft. The aft engine may ingest and re-energize boundary layer airflow over the aft end of the fuselage. The aft engine includes a nacelle extending around a fan having a plurality of fan blades. The nacelle includes a forward section having a lip. More particularly, the forward section of the nacelle includes a top portion having a top lip and a bottom portion having a bottom lip. An airflow duct is also provided extending at least partially through the nacelle and including an outlet on the lip of the forward section of the nacelle. The outlet provides an airflow to the lip of the forward section of the nacelle to urge an additional amount of boundary layer airflow over the aft end of the fuselage into the aft engine. Notably, in at least certain embodiments, a bottom side of the fuselage of the aft engine may have more, relatively low momentum airflow flowing thereover. A takeoff angle and other constraints may minimize an allowable size for the nacelle of the aft fan. Accordingly, in order to capture more of the relatively low momentum airflow flowing over the bottom side of the fuselage of the aircraft, the outlet of the airflow duct may be positioned on the bottom lip of the forward section of the nacelle to urge additional relatively low momentum airflow into the aft engine and/or guide air flow smoothly into the engine.

Figure 1:
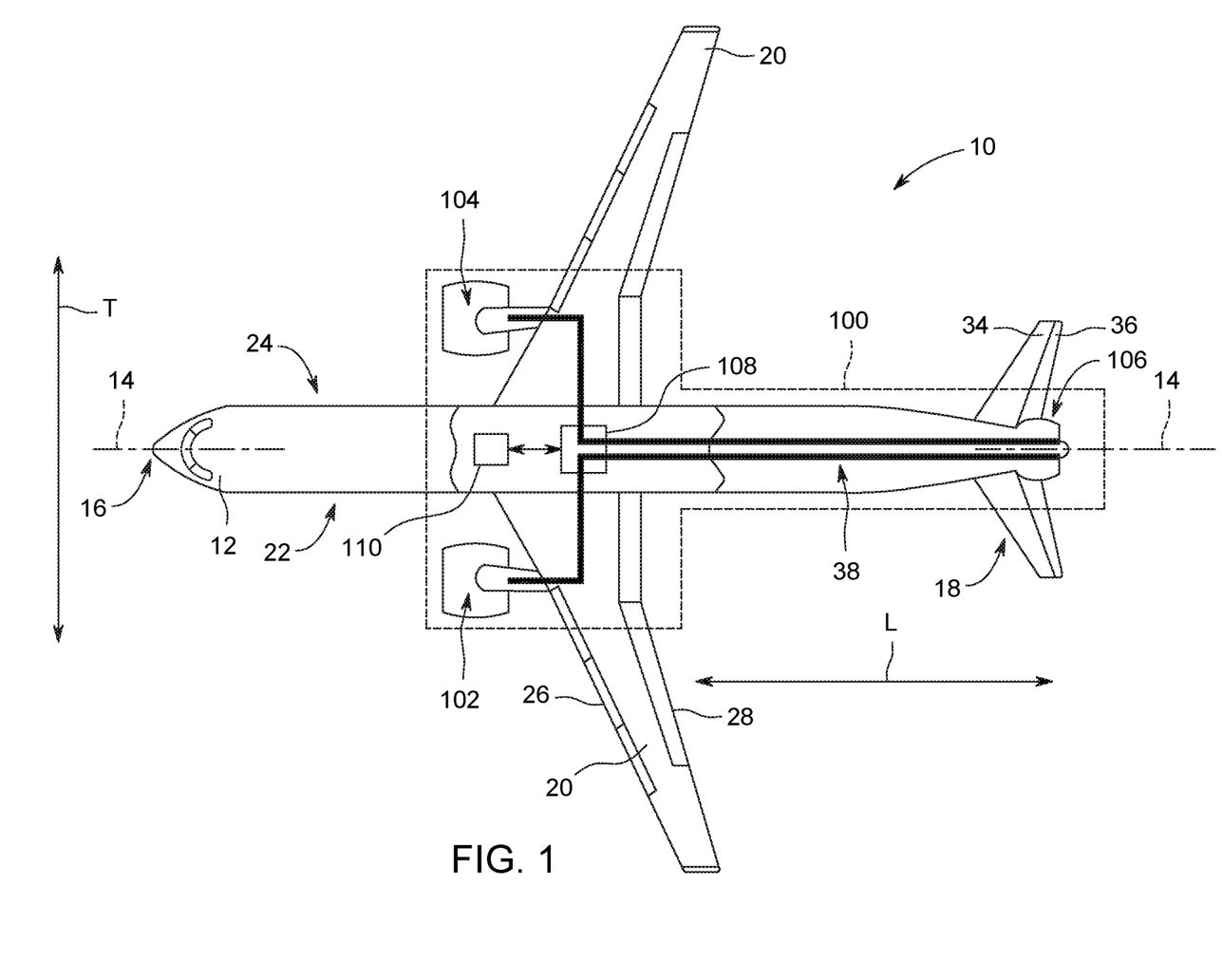
FIG. 1 is a top view of an aircraft according to various exemplary embodiments of the present disclosure.
Figure 2:
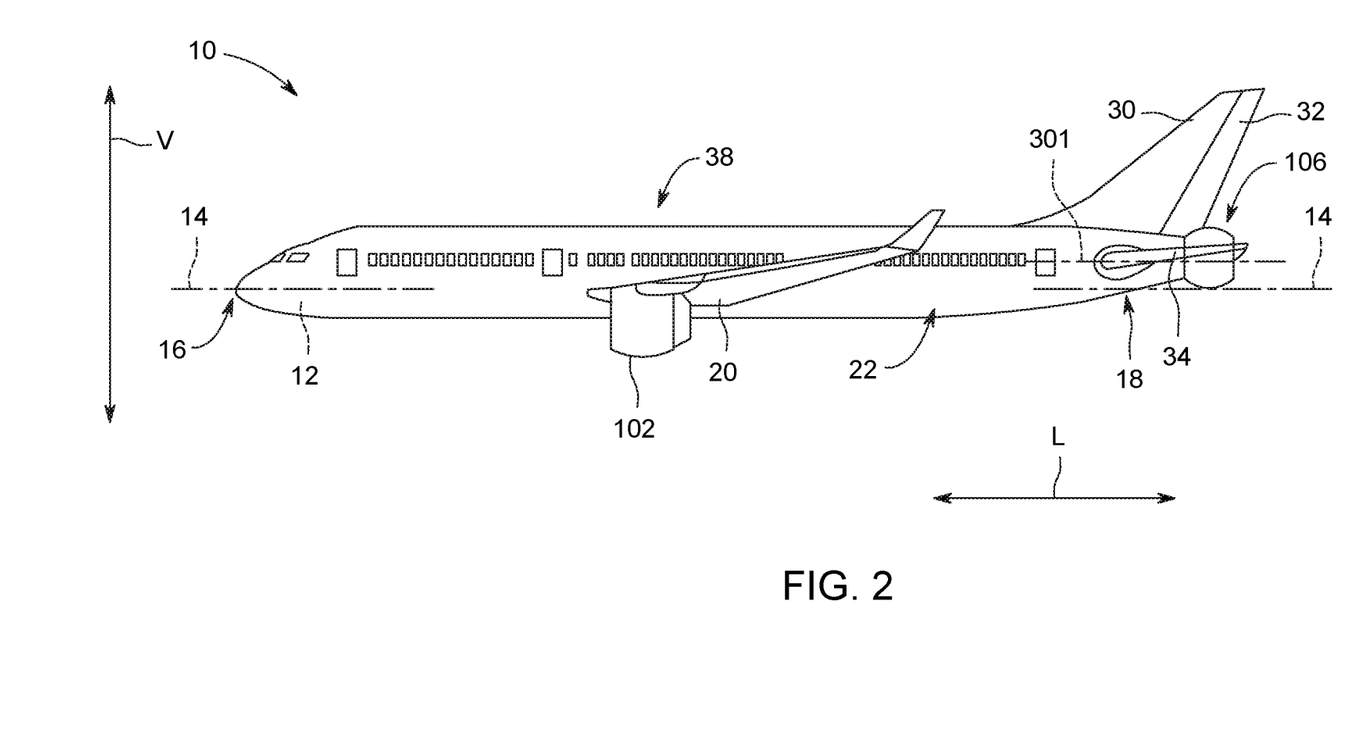
FIG. 2 is a port side view of the exemplary aircraft of FIG. 1

Referring now to the drawings, wherein identical numerals indicate the same elements throughout the figures, FIG. 1 illustrates a top view of one embodiment of the aircraft 10 according to the present disclosure. FIG. 2 illustrates a port side view of the aircraft 10 as illustrated in FIG. 1. As shown in FIGS. 1 and 2 collectively, the aircraft 10 defines a longitudinal centerline 14 that extends therethrough, a vertical direction V, a transverse direction T, and a longitudinal direction L.

Moreover, the aircraft 10 includes a fuselage 12, extending longitudinally between a forward end 16 and an aft end 18, and a pair of wings 20. As used herein, the term "fuselage" generally includes all of the body of the aircraft 10, such as an empennage of the aircraft 10 and an outer surface or skin 38 of the aircraft 10. The first of such wings 20 extends laterally outwardly with respect to the longitudinal centerline 14 from a port side 22 of the fuselage 12 and the second of such wings 20 extends laterally outwardly with respect to the longitudinal centerline 14 from a starboard side 24 of the fuselage 12. Further, as shown in the illustrated embodiment, each of the wings 20 depicted includes one or more leading edge flaps 26 and one or more trailing edge flaps 28. The aircraft 10 may also include a vertical stabilizer 30 having a rudder flap 32 for yaw control, and a pair of horizontal stabilizers 34, each having an elevator flap 36 for pitch control. It should be appreciated however, that in other exemplary embodiments of the present disclosure, the aircraft 10 may additionally or alternatively include any other suitable configuration of stabilizer that may or may not extend directly along the vertical direction V or horizontal/transverse direction T.

In addition, the aircraft 10 of FIGS. 1 and 2 includes a propulsion system 100, herein referred to as "system 100." The system 100 includes a pair of aircraft engines, at least one of which mounted to each of the pair of wings 20, and an aft engine. For example, as shown, the aircraft engines are configured as turbofan jet engines 102, 104 suspended beneath the wings 20 in an under-wing configuration. Additionally, the aft engine is configured as an engine that ingests and consumes air forming a boundary layer over the fuselage 12 of the aircraft 10. Specifically, the aft engine is configured as a fan, i.e., a Boundary Layer Ingestion (BLI) fan 106, configured to ingest and consume air forming a boundary layer over the fuselage 12 of the aircraft 10. Further, as shown in FIG. 2, the BLI fan 106 is mounted to the aircraft 10 at a location aft of the wings 20 and/or the jet engines 102, 104, such that a central axis 15 extends therethrough. As used herein, the "central axis" refers to a midpoint line extending along a length of the BLI fan 106. Further, for the illustrated embodiment, the BLI fan 106 is fixedly connected to the fuselage 12 at the aft end 18 of the fuselage 12, such that the BLI fan 106 is incorporated into or blended with a tail section at the aft end 18.

In various embodiments, the jet engines 102, 104 may be configured to provide power to an electric generator 108 and/or an energy storage device 110. For example, one or both of the jet engines 102, 104 may be configured to provide mechanical power from a rotating shaft (such as an LP shaft or HP shaft) to the electric generator 108. Additionally, the electric generator 108 may be configured to convert the mechanical power to electrical power and provide such electrical power to one or more energy storage devices 110 and/or the BLI fan 106. Accordingly, in such embodiments, the propulsion system 100 may be referred to as a gas-electric propulsion system. It should be appreciated, however, that the aircraft 10 and propulsion system 100 depicted in FIGS. 1 and 2 is provided by way of example only and that in other exemplary embodiments of the present disclosure, any other suitable aircraft 10 may be provided having a propulsion system 100 configured in any other suitable manner.

Figure 3:
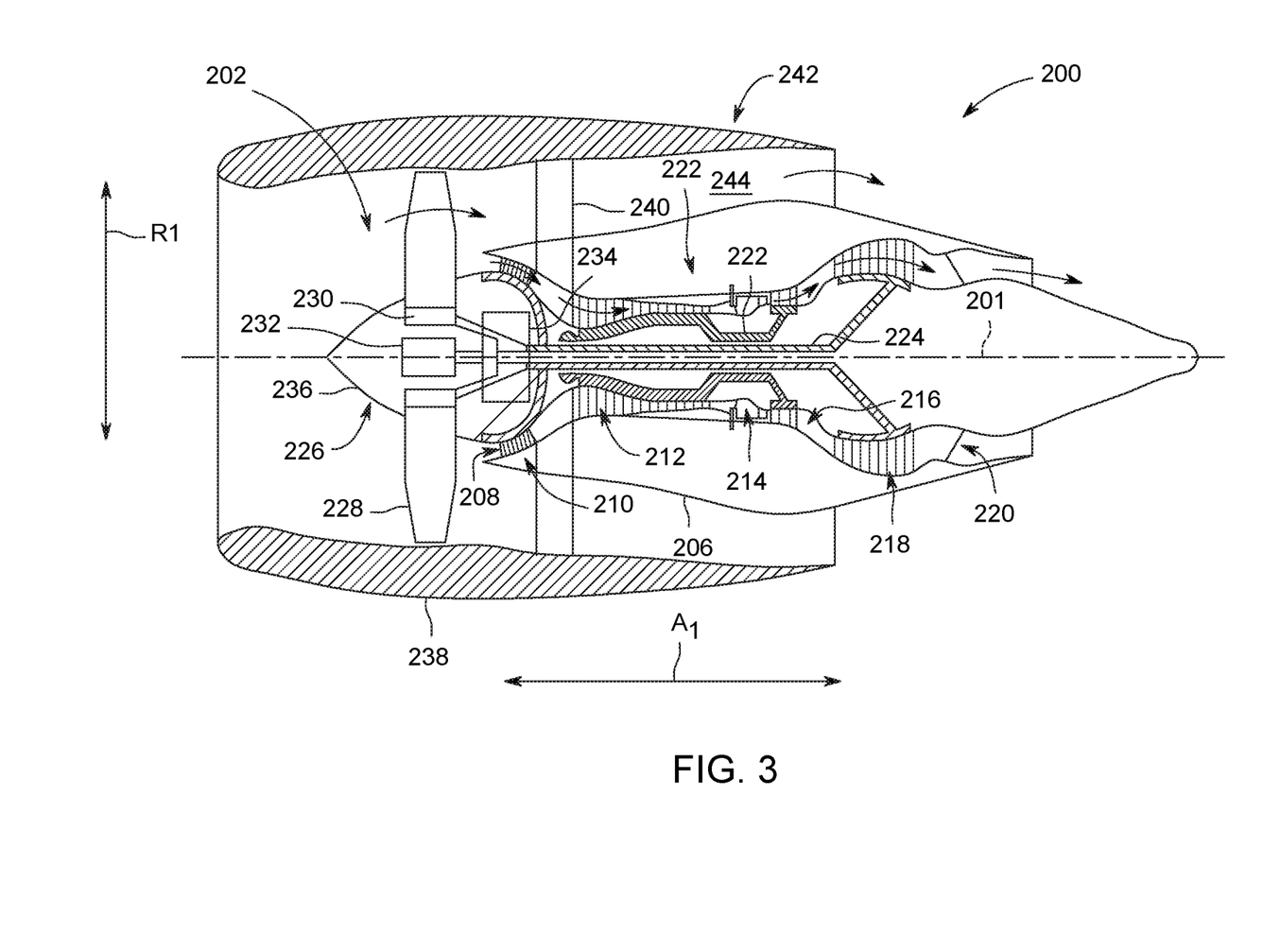
FIG. 3 is a schematic, cross-sectional view of a gas turbine engine in accordance with an exemplary embodiment of the present disclosure.

Referring now to FIG. 3, in certain embodiments, the jet engines 102, 104 may be configured as high-bypass turbofan jet engines. More specifically, FIG. 3 illustrates a schematic cross-sectional view of one embodiment of a high-bypass turbofan jet engine 200, herein referred to as "turbofan 200." In various embodiments, the turbofan 200 may be representative of jet engines 102, 104. Further, as shown, the turbofan 200 engine 10 defines an axial direction $A_1$ (extending parallel to a longitudinal centerline 201 provided for reference) and a radial direction $R_1$. In general, the turbofan 200 includes a fan section 202 and a core turbine engine 204 disposed downstream from the fan section 202.

In particular embodiments, the core turbine engine 204 generally includes a substantially tubular outer casing 206 that defines an annular inlet 208. It should be appreciated, that as used herein, terms of approximation, such as "approximately," "generally," "substantially," or "about," refer to being within a ten percent margin of error. The outer casing 206 encases, in serial flow relationship, a compressor section including a booster or low pressure (LP) compressor 210 and a high pressure (HP) compressor 212; a combustion section 214; a turbine section including a high pressure (HP) turbine 216 and a low pressure (LP) turbine 218; and a jet exhaust nozzle section 220. A high pressure (HP) shaft or spool 222 drivingly connects the HP turbine 216 to the HP compressor 212. A low pressure (LP) shaft or spool 224 drivingly connects the LP turbine 218 to the LP compressor 210.

Further, as shown, the fan section 202 includes a variable pitch fan 226 having a plurality of fan blades 228 coupled to a disk 230 in a spaced apart manner. As depicted, the fan blades 228 extend outwardly from the disk 230 generally along the radial direction $R_1$. Each fan blade 228 is rotatable relative to the disk 230 about a pitch axis by virtue of the fan blades 228 being operatively coupled to a suitable actuation member 232 configured to collectively vary the pitch of the fan blades 228, e.g., in unison. As such, the fan blades 228, the disk 230, and the actuation member 232 are together rotatable about the longitudinal axis 12 by LP shaft 224 across, for the embodiment depicted, a power gearbox 234. In certain embodiments, the power gearbox 234 includes a plurality of gears for stepping down the rotational speed of the LP shaft 224 to a more efficient rotational fan speed.

Referring still to FIG. 3, the disk 230 is covered by rotatable front hub 236 aerodynamically contoured to promote an airflow through the plurality of fan blades 228. Additionally, the fan section 202 includes an annular fan casing or outer nacelle 238 that circumferentially surrounds the fan 226 and/or at least a portion of the core turbine engine 204. The outer nacelle 238 is supported relative to the core turbine engine 204 by a plurality of circumferentially-spaced outlet guide vanes 240. Moreover, a downstream section 242 of the nacelle 238 extends over an outer portion of the core turbine engine 204 so as to define a bypass airflow passage 244 therebetween.

It should be appreciated, however, that the turbofan engine 200 depicted in FIG. 3 is by way of example only, and that in other exemplary embodiments, the turbofan engine 200 may have any other suitable configuration. Further, it should be appreciated, that in other exemplary embodiments, the jet engines 102, 104 may instead be configured as any other suitable aeronautical engine, such as a turbojet engine or turboprop engine.

Figure 4:
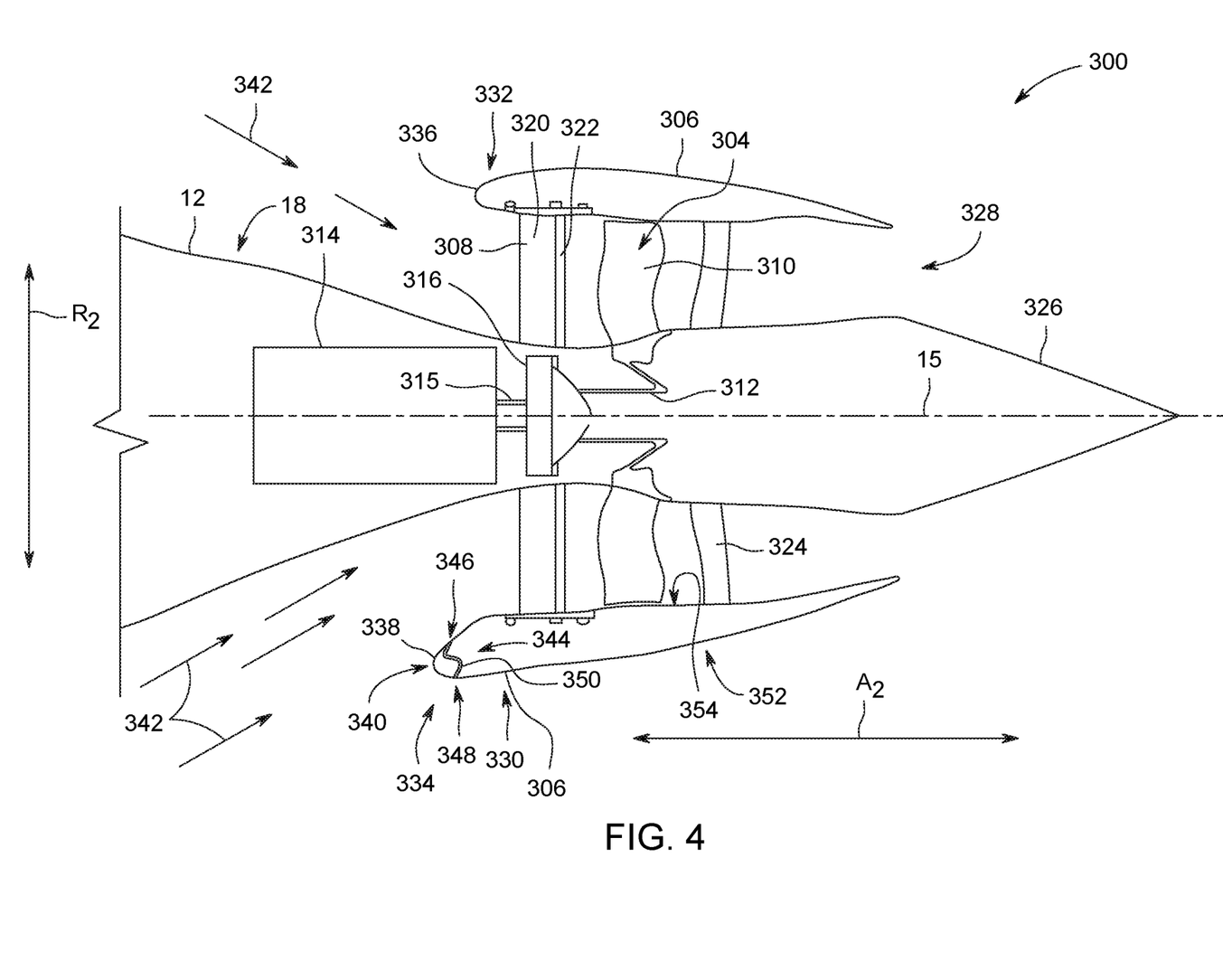
FIG. 4 is a schematic, cross-sectional view of an aft engine in accordance with an exemplary embodiment of the present disclosure.

Referring now to FIG. 4, a schematic, cross-sectional side view of an aft engine in accordance with various embodiments of the present disclosure is provided. More specifically, as shown, the aft engine is configured as a boundary layer ingestion (BLI) fan 300 mounted to an aft end 18 of a fuselage 12 of an aircraft 10. The BLI fan 300 may be configured in substantially the same manner as the BLI fan 106 described above with reference to FIGS. 1 and 2 and the aircraft 10 may be configured in substantially the same manner as the exemplary aircraft 10 described above with reference to FIGS. 1 and 2.

More specifically, as shown, the BLI fan 300 defines an axial direction $A_2$ extending along a centerline 301 of the BLI fan 300, which for the embodiment depicted is the same as the central axis 15. Additionally, the BLI fan 300 defines a radial direction $R_2$ and a circumferential direction $C_2$ (i.e., a direction extending about the axial direction $A_2$; see FIG. 7). In general, the BLI fan 300 includes a fan 304 rotatable about the centerline 301, a nacelle 306 extending around at least a portion of the fan 304, and one or more structural members extending between the nacelle 306 and the fuselage 12 of the aircraft 10. In certain embodiments, the one or more structural members may be configured as one or more inlet guide vanes 308 and/or as one or more outlet guide vanes 324. Notably, as used herein, the term "fuselage" includes an inner surface of the BLI fan 300 even though in certain embodiments, the inner surface of the BLI fan 300 may be formed with the BLI fan 300 and mounted to, e.g., a bulkhead (not shown) within the fuselage 12 of the aircraft 10 as a unit.

Further, the fan 304 includes a plurality of fan blades 310 spaced generally along the circumferential direction $C_2$. Moreover, where present, the inlet guide vanes 308 extend between the nacelle 306 and the fuselage 12 of the aircraft 10 at a location forward of the plurality of fan blades 310. More specifically, as shown, the inlet guide vanes 308 generally extend substantially along the radial direction $R_2$ of the BLI fan 300 between the nacelle 306 and the fuselage 12 of the aircraft 10 for mounting the BLI fan 300 to the fuselage 12 of the aircraft 10. In addition, the inlet guide vanes 308 may spaced substantially evenly along the circumferential direction $C_2$ of the BLI fan 300, or in any other suitable manner.

Further, the inlet guide vanes 308 may be shaped and/or oriented to direct and/or condition a flow of air into the BLI fan 300 to, e.g., increase an efficiency of the BLI fan 300, or reduce a distortion of the air flowing into the BLI fan 300. In addition, it should be understood that the inlet guide vanes 308 may be configured as fixed inlet guide vanes extending between the nacelle 306 and the fuselage 12 of the aircraft 10. Alternatively, the inlet guide vanes 308 may be configured as variable inlet guide vanes. For example, as shown in FIG. 4, the inlet guide vanes 308 include a body 320 and a tail flap 322. The body 320 is fixed relative to the nacelle 306 of the BLI fan 300 and the flap 322 is configured to rotate about a substantially radial axis. By rotating the flap 322 between various positions, the inlet guide vanes 308 may be configured to vary a direction in which air flowing thereover is directed.

As is also depicted in FIG. 4, the fan 304 additionally includes a fan shaft 312 with the plurality of fan blades 310 attached thereto. Although not depicted, the fan shaft 312 may be rotatably supported by one or more bearings located forward of the plurality of fan blades 310 and, optionally, one or more bearings located aft of the plurality of fan blades 310. Such bearings may be any suitable combination of roller bearings, ball bearings, thrust bearings, etc.

In certain embodiments, the plurality of fan blades 310 may be attached in a fixed manner to the fan shaft 312, or alternatively, the plurality of fan blades 310 may be rotatably attached to the fan shaft 312. For example, the plurality of fan blades 310 may be attached to the fan shaft 312 such that a pitch of each of the plurality of fan blades 310 may be changed, e.g., in unison, by a pitch change mechanism (not shown). Changing the pitch of the plurality of fan blades 310 may increase an efficiency of the BLI fan 300 and/or may allow the BLI fan 300 to achieve a desired thrust profile. With such an embodiment, the BLI fan 300 may be referred to as a variable pitch BLI fan.

The fan shaft 312 is mechanically coupled to a power source 314 located at least partially within the fuselage 12 of the aircraft 10, forward of the plurality of fan blades 310. Further, for the embodiment depicted, the fan shaft 312 is mechanically coupled to the power source 314 through a gearbox 316. The gearbox 316 may be configured to modify a rotational speed of the power source 314, or rather of a shaft 315 of the power source 314, such that the fan 304 of the BLI fan 300 rotates at a desired rotational speed. The gearbox 316 may be a fixed ratio gearbox, or alternatively, the gearbox 316 may define a variable gear ratio. With such an embodiment, the gearbox 316 may be operably connected to, e.g., a controller of the aircraft 10 for changing its ratio in response to one or more flight conditions.

In certain embodiments, the BLI fan 300 may be configured with a gas-electric propulsion system, such as the gas-electric propulsion system 100 described above with reference to FIG. 1. In such an embodiment, the power source 314 may be an electric motor that receives power from one or both of an energy storage device or an electric generator—such as the energy storage device 110 or electric generator 108 of FIGS. 1 and 2, the electric generator 108 converting mechanical power received from one or more under-wing mounted aircraft engines to electric power. Accordingly, in certain embodiments, the BLI fan 300 may be an electric fan. However, in other embodiments, the power source 314 may instead be any other suitable power source. For example, the power source 314 may alternatively be configured as a gas engine, such as a gas turbine engine or internal combustion engine. Moreover, in certain exemplary embodiments, the power source 314 may be positioned at any other suitable location within, e.g., the fuselage 12 of the aircraft 10 or the BLI fan 300. For example, in certain embodiments, the power source 314 may be configured as a gas turbine engine positioned at least partially within the BLI fan 300.

Referring still to FIG. 4, the BLI fan 300 may also additionally include one or more outlet guide vanes 324 and a tail cone 326. As shown in the illustrated embodiment, the outlet guide vanes 324 extend between the nacelle 306 and the tail cone 326 for directing a flow of air through the BLI fan 300, and optionally for adding strength and rigidity to the BLI fan 300. Further, the outlet guide vanes 324 may be evenly spaced along the circumferential direction $C_2$ or may have any other suitable spacing. Additionally, the outlet guide vanes 324 may be fixed outlet guide vanes, or alternatively may be variable outlet guide vanes. Inclusion of the plurality of outlet guide vanes 324 extending between the nacelle 306 and the tail cone 326 may allow for, e.g., an efficiency of the BLI fan 300 may be maximized.

Further, aft of the plurality of fan blades 310, and for the embodiment depicted, aft of the one or more outlet guide vanes 324, the BLI fan 300 additionally defines a nozzle 328 between the nacelle 306 and the tail cone 326. As such, the nozzle 328 may be configured to generate an amount of thrust from the air flowing therethrough. In addition, the tail cone 326 may be shaped to minimize an amount of drag on the BLI fan 300. However, in other embodiments, the tail cone 326 may have any other shape and may, e.g., end forward of an aft end of the nacelle 306 such that the tail cone 326 is enclosed by the nacelle 306 at an aft end. Additionally, in other embodiments, the BLI fan 300 may not be configured to generate any significant amount of thrust, and instead may be configured to ingest air from a boundary layer of air of the fuselage 12 of the aircraft 10 and add energy/speed up such air to reduce an overall drag on the aircraft 10 (and thus increase a propulsive efficiency of the aircraft 10).

Referring still to FIG. 4, the nacelle 306 extends around and encircles the plurality of fan blades 310, and also extends around the fuselage 12 of the aircraft 10 at the aft end 18 of the fuselage 12 when, as shown in FIG. 4, the BLI fan 300 is mounted to the fuselage 12. Notably, as used herein, the term "nacelle" includes the nacelle as well as any structural fan casing or housing. The nacelle 306 generally includes a forward section 330 having a lip (the "forward section 330" being a portion of the nacelle 306 forward of the plurality of fan blades 310). More specifically, the forward section 330 of the nacelle 306 includes a top portion 332 and a bottom portion 334. The top portion 332 includes a top lip 336 and the bottom portion 334 includes a bottom lip 338. Notably, in certain embodiments, the top portion 332 may be a top half of the forward section 330 of the nacelle 306 and the bottom portion 334 may be a bottom half of the forward section 330 of the nacelle 306. However, in other embodiments, the bottom portion 334 may only be a bottom twenty-five percent (25%) of the forward section 330 of the nacelle 306. Additionally, as used herein, the term "lip", such as the top lip 336 or bottom lip 338, may refer to a forward twenty percent (20%) of the portion of the nacelle 306, based on a total camber line length of the respective portion of the nacelle 306.

Figure 5:
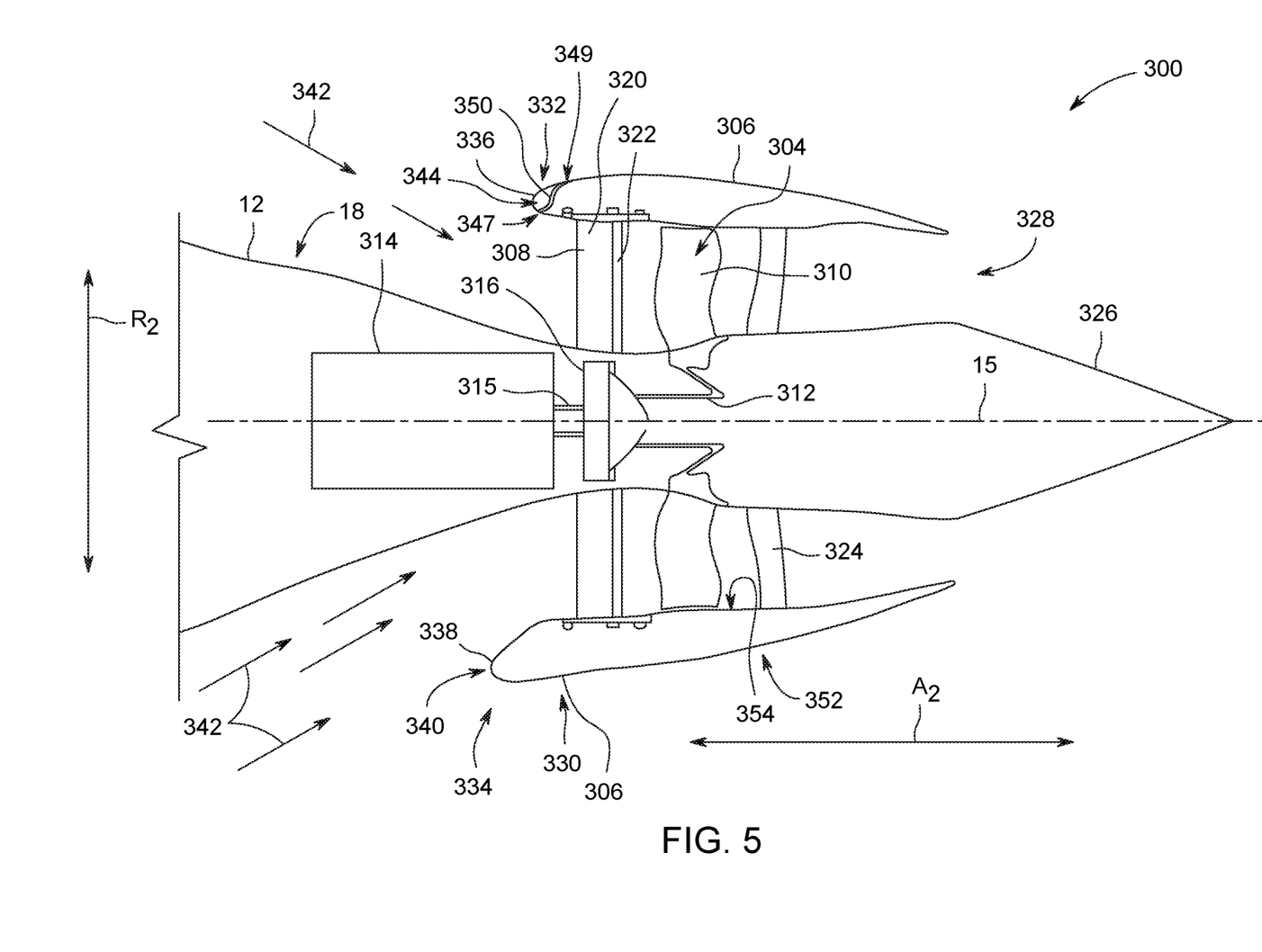
FIG. 5 is a schematic, cross-sectional view of an aft engine in accordance with another exemplary embodiment of the present disclosure.

As will be appreciated, the bottom lip 338 of the forward section 330 of the nacelle 306 defines a baseline stagnation point 340. The baseline stagnation point 340 refers to a point on the bottom lip 338 inward of which a boundary layer airflow 342 is ingested by the BLI fan 300 and outward of which the boundary layer airflow 342 passes over the nacelle 306 of the BLI fan 300. "Inward", as used herein, refers to relative position along the radial direction $R_2$ closer to the centerline 301 and "outward", as used herein, refers to the relative position along the radial direction $R_2$ farther away from the centerline 301. In order to increase an amount of airflow and more smoothly guide the boundary layer airflow 342 ingested by the BLI fan 300, an airflow duct 344 is provided extending at least partially through the nacelle 306 and including an opening on the forward section 330 of the nacelle 306 for providing an airflow to the forward section 330 of the nacelle 306. More specifically, for the exemplary embodiment depicted, the opening of the airflow duct 344 is an outlet 346. The outlet 346 is positioned on the lip of the forward section 330 of the nacelle 306 and provides an airflow to the lip of the forward section 330 of the nacelle 306 to urge or guide boundary layer airflow 342 into the BLI fan 300. More specifically, for the embodiment depicted, the outlet 346 of the airflow duct 344 is positioned on the bottom lip 338 of the bottom portion 334 of the forward section 330 of the nacelle 306. As will be discussed in greater detail below, the outlet 346 is oriented inwardly along the radial direction $R_2$ in order to urge or guide an additional amount of boundary layer airflow 342 into the BLI fan 300. Notably, as used herein, the term "oriented inwardly along the radial direction", with respect to the outlet 342, refers to a local portion of the airflow duct 344 immediately upstream of the outlet 342 defining a centerline pointed towards, or intersecting with, the centerline 301 of the BLI fan 300. Additionally, for the embodiment depicted, the outlet 346 is oriented in the same direction as the incoming boundary flow 342 (i.e., a local portion of the airflow duct 344 immediately upstream of the outlet 342 defining a centerline intersecting the centerline 301 at a location aft of the outlet 342 along the axial direction $A_2$). It should be appreciated, however, that in other exemplary embodiments, the outlet 346 may alternatively be oriented in a direction towards the incoming boundary flow 342 so as to reduce the level of inflow distortion seen by the BLI fan 300 (see embodiment of FIG. 5, described below).

Additionally, the airflow duct 344 includes an inlet 348 and a body 350. As is depicted, the nacelle 306 includes an outer surface 352 and the inlet 348 of the airflow duct 344 is positioned on the outer surface 352 of the nacelle 306 for receiving a flow of air, such as a flow of substantially higher pressure air relative to the boundary layer airflow 342. For the embodiment depicted, the body 350 of the airflow duct 344 extends from the inlet 348 on the outer surface 352 of the nacelle 306, to the outlet 346 on the bottom lip 338 of the forward section 330 of the nacelle 306. The air received through the inlet 348 may flow through the body 350 to the outlet 346, which as is stated is for the embodiment depicted oriented inwardly along the radial direction $R_2$ of the BLI fan 300. Providing the air received through the inlet 348, which may be at a relatively high pressure relative to the boundary layer airflow 342 over the fuselage 12 of the aircraft 10, to and through the outlet 346 of the airflow duct 344 may result in the airflow being guided more smoothly into the fan or an additional amount of boundary layer airflow 342 to be ingested by the BLI fan 300.

It should be appreciated, however, that in other embodiments, the aft engine, nacelle 306 of the aft engine, and airflow duct 344 may additionally or alternatively be configured in any other suitable manner. For example, referring now briefly to FIG. 5, providing a close-up view of an airflow duct 344 in accordance with another exemplary embodiment of the present disclosure, the opening on the forward section 330 of the nacelle 306 is instead configured for receiving an airflow from the forward section 330 of the nacelle 306. With such a configuration, the opening is not configured as the outlet 346, and instead is configured as an inlet 347 such that an airflow is vented from within the nacelle 306 to an outlet 349 of the airflow duct 344 (e.g., to reduce a distortion perceived by the fan). Additionally, referring now to FIG. 6, a close-up view of an airflow duct 344 in accordance with yet another exemplary embodiment of the present disclosure is provided, the airflow duct 344 extending at least partially through a nacelle 306 of an aft engine. The exemplary airflow duct 344 and aft engine depicted in FIG. 6 may be configured in substantially the same manner as exemplary airflow duct 344 and aft engine described above with reference to FIG. 4. Accordingly, the same numbers may refer to the same or similar part.

Figure 6:
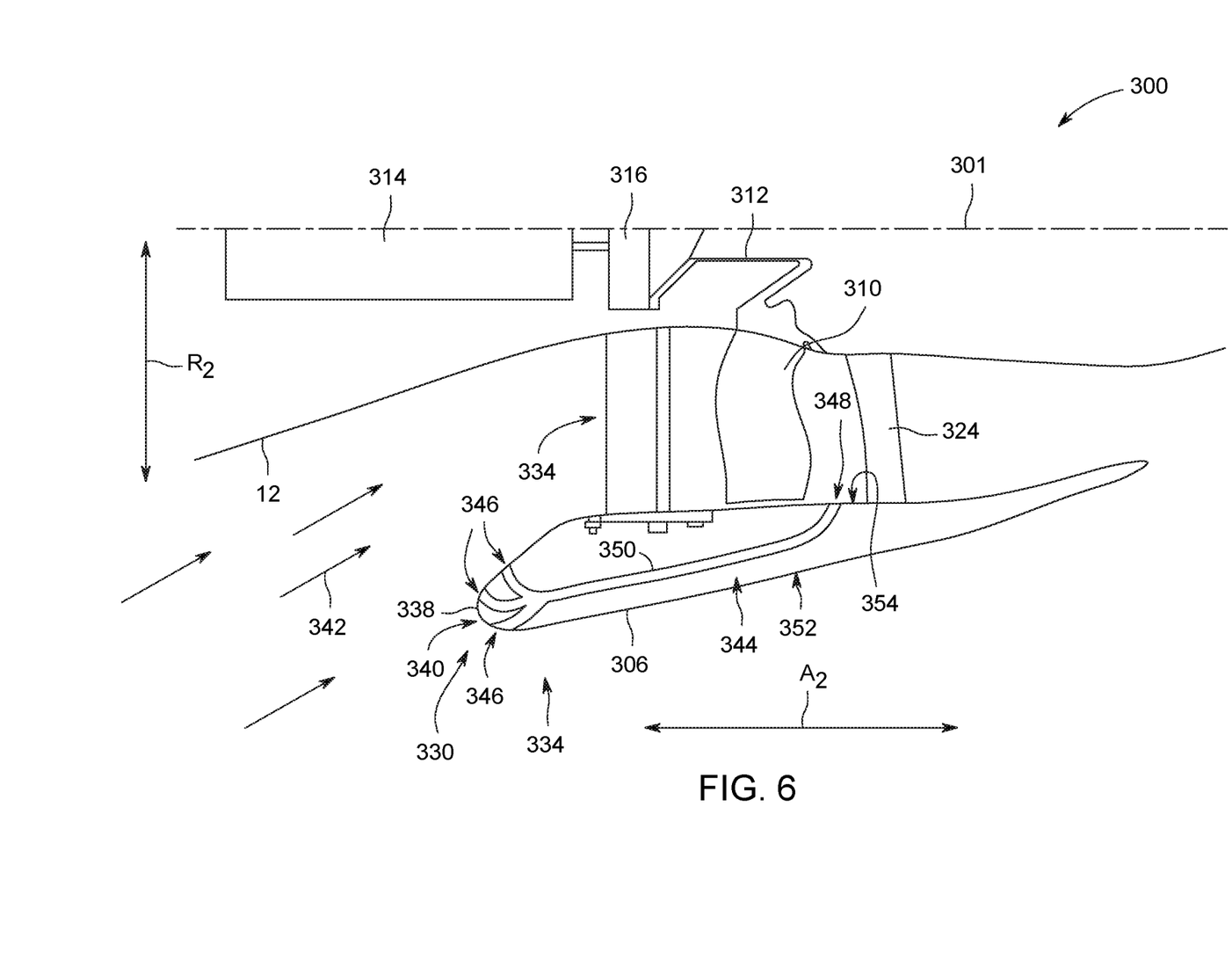
FIG. 6 is a schematic, cross-sectional view of an aft engine in accordance with yet another exemplary embodiment of the present disclosure.

As is depicted, the aft engine may be configured as a BLI fan 300, with the BLI fan 300 including a nacelle 306 encircling a fan 304 having a plurality of fan blades 310. The nacelle 306 includes a forward section 330 having a lip, or more particularly, a forward section 330 defining a top portion 332 having a top lip 336 and a bottom portion 334 having a bottom lip 338. Additionally, an airflow duct 344 is provided having an inlet 348 and an outlet 346, with a body 350 extending therebetween. However, for the embodiment depicted, the inlet 348 is not positioned on an outer surface 352 of the nacelle 306, and instead the airflow duct 344 defines an inlet 348 on an inner surface 354 of the nacelle 306. More specifically, the airflow duct 344 defines the inlet 348 on the inner surface 354 of the nacelle 306 downstream of the fan 304, or rather downstream of the plurality of fan blades 310 of the fan 304. Such a configuration may ensure an airflow through the airflow duct 344, as the inlet 348 is positioned at a relatively high pressure area of the BLI fan 300, such that the airflow duct 344 may receive pressurized air from the BLI fan 300. Notably, although for the embodiment depicted the inlet 348 is defined on the inner surface 354 of the nacelle 306 immediately downstream of the plurality of fan blades 310 of the fan 304, in other embodiments, the inlet 348 may be defined on the inner surface 354 of the nacelle 306 at a nozzle section 328 of the BLI fan 300.

Moreover, as is also depicted, for the embodiment depicted, the outlet 346 of the airflow duct 344 includes a plurality of outlets 346. The plurality of outlets 346 includes at least one outlet 346 positioned outward of a baseline stagnation point 340 of the bottom portion 334 of the forward section 330 of the nacelle 306, and at least one outlet 346 positioned inward of the baseline stagnation point 340 of the bottom portion 334 of the forward section 330 of the nacelle 306. For the embodiment depicted, each of the plurality of outlets 346 are oriented inwardly along a radial direction $R_2$ of the BLI fan 300.

It should be appreciated, however, that although each of the plurality of outlets 346 are spaced along the radial direction $R_2$ of the BLI fan 300 for the embodiment depicted, in other embodiments, the plurality of outlets 346 may additionally, or alternatively, be spaced in any other suitable manner. For example, referring now to FIG. 7, a forward-looking-aft view of a BLI fan 300 is provided in accordance with an exemplary aspect of the present disclosure. The exemplary BLI fan 300 of FIG. 7 may be configured in substantially the same manner as exemplary BLI fan 300 of FIG. 4. Accordingly, the same numbers refer to the same or similar part. The exemplary BLI fan 300 includes an outer nacelle 306 that extends generally along a circumferential direction of the BLI fan 300. A forward section 330 of the outer nacelle 306 is provided with a plurality of outlets 346 of an airflow duct 344 defined therein. As is depicted, the plurality of outlets 346 are, for the exemplary embodiment of FIG. 7, spaced along a lip of the forward section 330 of the nacelle 306. More specifically, for the embodiment depicted, the plurality of outlets 346 are spaced along the circumferential direction $C_2$ of the BLI fan 300, or more particularly, spaced along a bottom lip 338 of a bottom portion 334 of the forward section 330 of the nacelle 306 along the circumferential direction $C_2$ of the BLI fan 300. It should be appreciated, however, that in other exemplary embodiments, the plurality of outlets 346 may additionally, or alternatively, be spaced along a top lip 336 of the top portion 332 of the nacelle 306.

Figure 7:
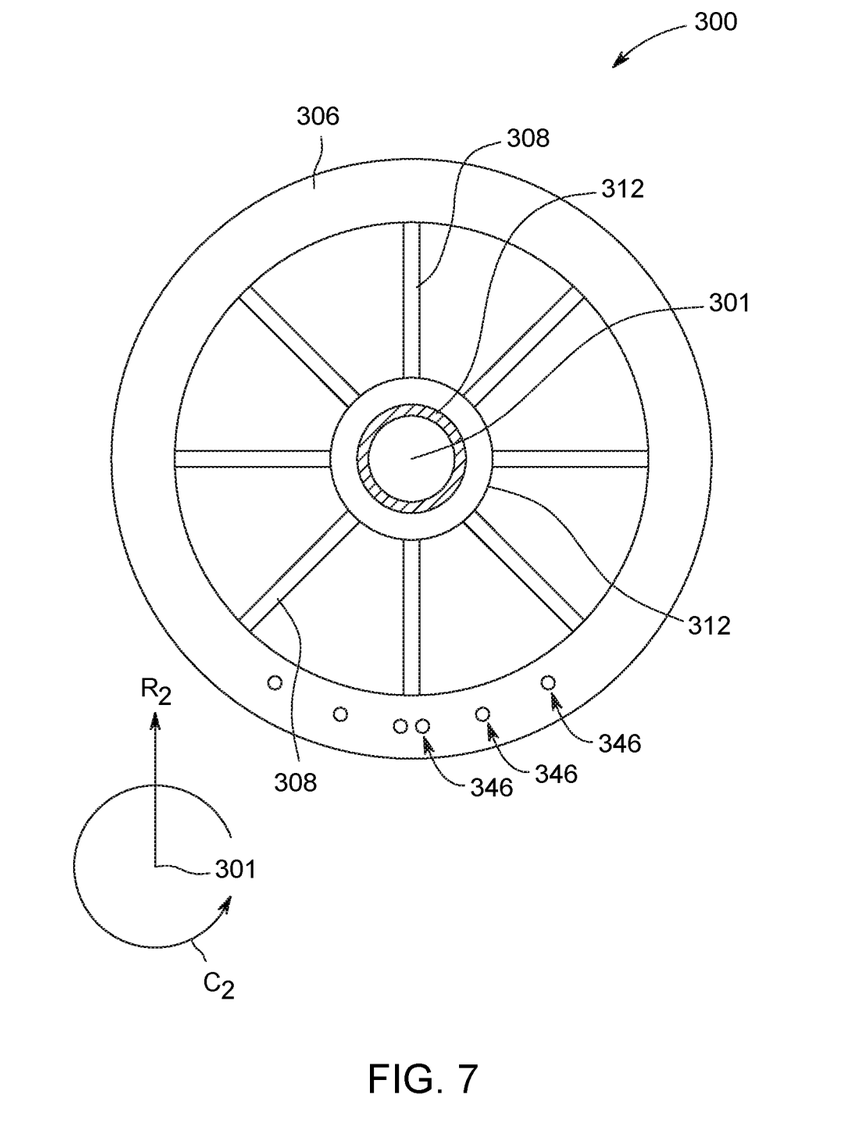
FIG. 7 is a forward-looking-aft view of an aft engine in accordance with yet another exemplary embodiment of the present disclosure.

In certain embodiments, the plurality of outlets 246 may be spaced substantially evenly along the circumferential direction $C_2$. Alternatively, as in the embodiment depicted, the plurality of outlets 346 may be spaced closer together proximate a bottom-most point of the bottom portion 334 of the forward section 330. Such a configuration may maximize a benefit achieved by inclusion of the airflow duct 344. Additionally, for the embodiment depicted, each of the plurality of outlets 346 are substantially the same size. However, in other embodiments, one or more of the plurality of outlets 246 may define any other suitable size relative to the rest of the plurality of outlets 246.

Moreover, it should be appreciated, that in other embodiments, the airflow duct 344 may additionally be configured in any other suitable manner. For example, although for the exemplary embodiments described above, the entirety of the airflow duct 344 is positioned within the nacelle 306, in other embodiments, the airflow duct 344 may instead extend through/be positioned within other components of the aft engine and/or aircraft 10. For example, referring now to FIG. 8, a close-up view of an airflow duct 344 in accordance with yet another exemplary embodiment of the present disclosure is provided, the airflow duct 344 extending at least partially through a nacelle 306 of an aft engine. The exemplary airflow duct 344 and aft engine depicted in FIG. 8 may be configured in substantially the same manner as exemplary airflow duct 344 and aft engine described above with reference to FIG. 4. Accordingly, the same numbers may refer to the same or similar part.

Figure 8:
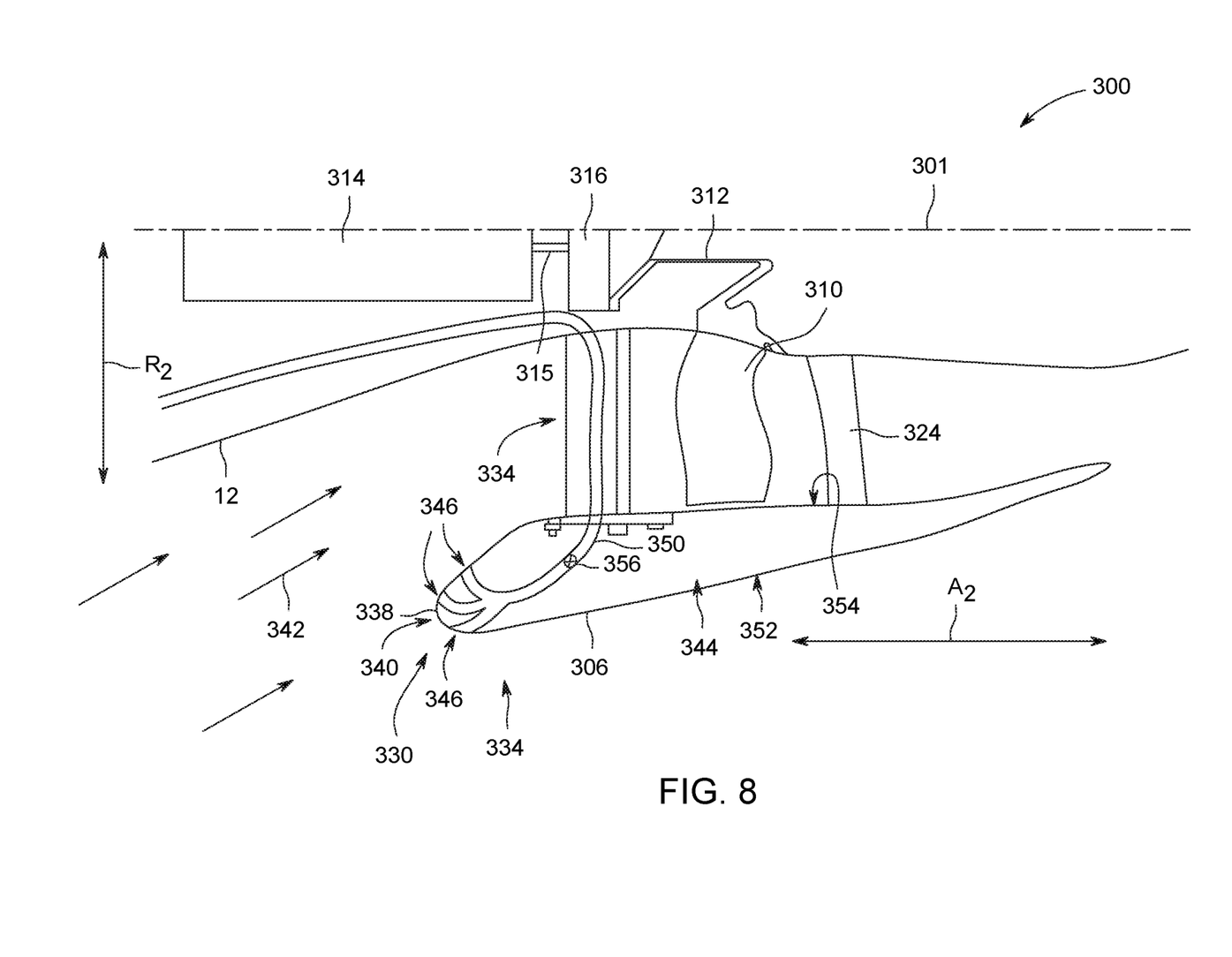
FIG. 8 is a schematic, cross-sectional view of an aft engine in accordance with still another exemplary embodiment of the present disclosure.

As is depicted, the aft engine may be configured as a BLI fan 300, with the BLI fan 300 including a nacelle 306 and a plurality of structural members extending between the nacelle 306 and a fuselage 12 of an aircraft 10 to which the BLI fan 300 is mounted. The exemplary structural members depicted are configured generally as inlet guide vanes 308. The nacelle 306 includes a forward section 330 having a lip, or more particularly, a forward section 330 defining a top portion 332 having a top lip 336 and a bottom portion 334 having a bottom lip 338. Additionally, an airflow duct 344 is provided having outlet 346 on the bottom lip 338 for providing an airflow to the bottom lip 338. However, for the embodiment depicted, the airflow duct 344 does not define an inlet 348 positioned on the nacelle 306, and instead is configured to receive an airflow from a location remote from the BLI fan 300. Specifically, for the embodiment depicted, the airflow duct 344 extends at least partially through the nacelle 306, through one or more of the structural members, or rather through one or more of the inlet guide vanes 308, and forward through the fuselage 12 of the aircraft 10. With such an exemplary embodiment, the airflow duct 344 may be configured to receive pressurized air from, e.g., from one or more underwing mounted engines (e.g., from a compressor section of an underwing mounted engine; see FIG. 3), or from any other suitable pressurized air source. With such an exemplary embodiment, the airflow duct 344 further includes a variable throughput valve 356 positioned at least partially within the airflow duct 344, or rather at least partially within the body 350 of the airflow duct 344, such that the pressurized air flowing therethrough may be regulated.

It should be appreciated, however, that in other exemplary embodiments, the aft engine, nacelle 306, and airflow duct 344 may have any other suitable configuration. For example, in other exemplary embodiments, the airflow duct 344 may additionally, or alternatively, include one or more outlets positioned on the top lip 336 of the top portion 334 of the forward section 330 of the nacelle 306. Moreover, in still other embodiments, the airflow duct 344 may include additional features not described or depicted herein. For example, in other embodiments, the airflow duct 344 may include one or more fans or other pressurization devices for pressurizing an airflow therethrough.

Inclusion of an airflow duct 344 with an aft engine in accordance with one or more exemplary embodiments of the present disclosure may allow for an increased efficiency of the aft engine by guiding boundary layer airflow or urging additional relatively low momentum airflow 342 flowing over a bottom side of the fuselage 12 of an aircraft 10 into the aft engine. Such may contribute to an overall increase an efficiency of the aircraft 10, resulting in, e.g., a lower overall fuel consumption. Additionally, or alternatively, inclusion of an airflow duct 344 in accordance with one or more embodiments of the present disclosure may reduce a perceived distortion on the fan of the aft engine by, e.g., venting airflow from within the nacelle to, e.g., reduce a severity of a total pressure distortion pattern ingested by the fan.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An aircraft defining a longitudinal direction and comprising:
   a fuselage extending between a forward end and an aft end along the longitudinal direction of the aircraft;
   an aft engine mounted to the aft end of the fuselage, the aft engine further comprising a nacelle including a forward section; and
   an airflow duct extending at least partially through the nacelle of the aft engine and defining an outlet on the forward section of the nacelle for providing an airflow to the forward section of the nacelle,
   wherein the airflow duct includes a plurality of outlets, the plurality of outlets including at least one first outlet positioned outward of a baseline stagnation point of a bottom portion of the forward section of the nacelle and at least one second outlet positioned inward of the baseline stagnation point of the bottom portion of the forward section of the nacelle, and wherein airflow is directed through the at least one first outlet positioned outward of a baseline stagnation point and the at least one second outlet positioned inward of the baseline stagnation point simultaneously.

2. The aircraft of claim 1, wherein the forward section of the nacelle defines a lip, and wherein the outlet is positioned on the lip.

3. The aircraft of claim 1, wherein the plurality of outlets are spaced along a bottom lip of a bottom portion of the forward section of the nacelle, and wherein the plurality of outlets are proximate a bottom-most point of the bottom portion of the forward section of the nacelle.

4. The aircraft of claim 1, wherein the aft engine comprises a support member extending from the fuselage of the aircraft to the nacelle, and wherein the airflow duct extends at least partially through the support member.

5. The aircraft of claim 1, further comprising:
   a variable throughput valve positioned at least partially within the airflow duct.

6. The aircraft of claim 1, wherein the nacelle defines an inner surface, and wherein the airflow duct defines an inlet on the inner surface of the nacelle.

7. The aircraft of claim 6, wherein the aft engine comprises a fan, and wherein the airflow duct defines the inlet on the inner surface of the nacelle downstream from the fan.

8. The aircraft of claim 1, wherein the airflow duct is configured to receive an airflow from a location remote from the aft engine.

9. The aircraft of claim 8, wherein the airflow duct extends at least partially through the nacelle, through one or more structural members and forward through the fuselage of the aircraft.

10. The aircraft of claim 9, wherein the one or more of the structural members are positioned upstream of at least one blade.

11. A propulsion system for an aircraft, the aircraft comprising a fuselage defining an aft end, the propulsion system comprising:
    an aft engine configured to be mounted to the aft end of the fuselage, the aft engine further comprising a nacelle including a forward section; and
    an airflow duct extending at least partially through the nacelle of the aft engine and comprising first and second outlets on the forward section of the nacelle for providing an airflow to the forward section of the nacelle, wherein the airflow duct includes a body extending between an inlet and at least one outlet, the inlet and the outlet each positioned inward of the baseline stagnation point of the bottom portion of the forward section of the nacelle and the body having a portion extending outwardly of the baseline stagnation point of the bottom portion of the forward section of the nacelle.

12. The propulsion system of claim 11, wherein the first outlet is positioned outward of the baseline stagnation point of a bottom portion of the forward section of the nacelle.

13. The propulsion system of claim 11, wherein the second outlet is positioned inward of a baseline stagnation point of a bottom portion of the forward section of the nacelle.

14. The propulsion system of claim 11, wherein the airflow is directed at least partially radially outward through the duct.

15. An aircraft defining a longitudinal direction and comprising:
   a fuselage extending between a forward end and an aft end along the longitudinal direction of the aircraft;
   an aft engine mounted to the aft end of the fuselage and including one or more fan blades, the aft engine further comprising a nacelle including a forward section;
   an airflow duct extending at least partially through the nacelle of the aft engine and comprising an outlet on the forward section of the nacelle and radially below a fan shaft for providing an airflow to the forward section of the nacelle; and
   a variable throughput valve positioned within the nacelle, forwardly of the one or more fan blades, and at least partially within the airflow duct.

16. The aircraft of claim 15, wherein the aft engine comprises a fan, and wherein the airflow duct further defines an inlet on an inner surface of the nacelle downstream from the fan.

17. The aircraft of claim 15, wherein the aft engine comprises a support member extending from the fuselage of the aircraft to the nacelle, and wherein the airflow duct extends at least partially through the support member.

18. The aircraft of claim 15, wherein the outlet of the airflow duct comprises a plurality of outlets.

\* \* \* \* \*